US009962938B2

(12) United States Patent
Friesen et al.

(10) Patent No.: US 9,962,938 B2
(45) Date of Patent: May 8, 2018

(54) FLUID FEED SLOT FOR FLUID EJECTION DEVICE

(71) Applicant: Hewlett-Packard Development Company, L.P., Houston, TX (US)

(72) Inventors: Ed Friesen, Corvallis, OR (US); Rio Rivas, Corvallis, OR (US); Kelly Ronk, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 14/766,925

(22) PCT Filed: Feb. 13, 2013

(86) PCT No.: PCT/US2013/025931
§ 371 (c)(1),
(2) Date: Aug. 10, 2015

(87) PCT Pub. No.: WO2014/126559
PCT Pub. Date: Aug. 21, 2014

(65) Prior Publication Data
US 2016/0031216 A1 Feb. 4, 2016

(51) Int. Cl.
*B41J 2/16* (2006.01)
*B41J 2/175* (2006.01)
(Continued)

(52) U.S. Cl.
CPC .............. *B41J 2/162* (2013.01); *B23K 26/382* (2015.10); *B23K 26/402* (2013.01);
(Continued)

(58) Field of Classification Search
CPC ........ B41J 2/162; B41J 2/1433; B41J 2/1753; B41J 29/393; B41J 2/1634; B41J 2/1628;
(Continued)

(56) References Cited

U.S. PATENT DOCUMENTS 5,929,879 A   7/1999  Karita et al.
6,648,454 B1 * 11/2003  Donaldson ........... B41J 2/14145
                                                 347/65
(Continued)

FOREIGN PATENT DOCUMENTS

CN          1926056        3/2007
JP         2008179039      8/2008
(Continued)

OTHER PUBLICATIONS

Mai, T.A. et al., "Laser Slotting of Silicon for Inkjet Printer Heads", Dec. 22, 2005, pp. 169-173.
(Continued)

*Primary Examiner* — Henok Legesse
(74) *Attorney, Agent, or Firm* — Dicke, Billig & Czaja, PLLC (57) ABSTRACT

A method of forming a substrate for a fluid ejection device includes forming an opening in the substrate from a second side toward a first side, and further forming the opening in the substrate to the first side, including increasing the opening to the first side and increasing the opening at the second side, and forming the opening with substantially parallel sidewalls intermediate the first side and the second side and converging sidewalls to the first side.

9 Claims, 12 Drawing Sheets

(51) Int. Cl.
*B41J 29/393* (2006.01)
*B23K 26/382* (2014.01)
*B23K 26/402* (2014.01)
*B41J 2/14* (2006.01)
*B23K 103/00* (2006.01)
*B23K 103/08* (2006.01)
*B23K 103/10* (2006.01)
*B23K 103/12* (2006.01)
*B23K 103/14* (2006.01)

(52) U.S. Cl.
CPC ........... *B41J 2/1433* (2013.01); *B41J 2/1603* (2013.01); *B41J 2/1628* (2013.01); *B41J 2/1629* (2013.01); *B41J 2/1631* (2013.01); *B41J 2/1632* (2013.01); *B41J 2/1634* (2013.01); *B41J 2/1753* (2013.01); *B41J 29/393* (2013.01); *B23K 2203/08* (2013.01); *B23K 2203/10* (2013.01); *B23K 2203/12* (2013.01); *B23K 2203/14* (2013.01); *B23K 2203/42* (2015.10); *B23K 2203/50* (2015.10); *B23K 2203/52* (2015.10); *B23K 2203/54* (2015.10); *B23K 2203/56* (2015.10)

(58) Field of Classification Search
CPC ...... B41J 2/1603; B41J 2/1632; B41J 2/1629; B41J 2/1631; B23K 26/382; B23K 26/402; B23K 2203/56; B23K 2203/08; B23K 2203/12; B23K 2203/18; B23K 2203/10
See application file for complete search history.

(56) References Cited

U.S. PATENT DOCUMENTS

| | | |
|---|---|---|
| 6,787,052 B1 | 9/2004 | Vaganov |
| 6,806,108 B2 | 10/2004 | Park et al. |
| 6,926,386 B2 | 8/2005 | Shin et al. |
| 6,930,055 B1 | 8/2005 | Bhowmik et al. |
| 7,191,520 B2 | 3/2007 | Shantharama et al. |
| 7,238,293 B2 | 7/2007 | Donaldson et al. |
| 7,275,308 B2 | 10/2007 | Kim et al. |
| 7,285,226 B2 | 10/2007 | Bengali |
| 7,522,533 B2 | 6/2009 | Fartash |
| 7,895,750 B2 | 3/2011 | Park et al. |
| 8,029,119 B2 | 10/2011 | Sassano et al. |
| 8,114,305 B2 * | 2/2012 | Komiyama ............ B41J 2/1603 216/27 |
| 8,287,747 B2 * | 10/2012 | Kishimoto ............. B41J 2/1603 216/17 |
| 2004/0084404 A1 | 5/2004 | Donaldson et al. |
| 2004/0155943 A1 | 8/2004 | Kim et al. |
| 2005/0012772 A1 | 1/2005 | Truninger et al. |
| 2005/0196885 A1 | 9/2005 | Pollard et al. |
| 2007/0085881 A1 | 4/2007 | Cornell et al. |
| 2007/0178014 A1 | 8/2007 | Haushalter et al. |
| 2008/0180486 A1 | 7/2008 | Ozaki et al. |
| 2009/0053898 A1 | 2/2009 | Kommera et al. |
| 2009/0191690 A1 | 7/2009 | Boyle et al. |
| 2010/0028812 A1 | 2/2010 | Park et al. |
| 2010/0141709 A1 | 6/2010 | DeBrabander et al. |
| 2010/0253743 A1 | 10/2010 | Takeuchi |
| 2011/0018930 A1 | 1/2011 | Bhwomik et al. |

FOREIGN PATENT DOCUMENTS

| | | |
|---|---|---|
| KR | 20110007273 A | 1/2011 |
| WO | WO-2005092785 | 10/2005 |
| WO | WO-2009127738 A1 | 10/2009 |
| WO | WO-2011053288 A1 | 5/2011 |
| WO | WO-2012054021 A1 | 4/2012 |

OTHER PUBLICATIONS

PCT Search Report and Written Opinion for PCT/US2013/025931, dated Oct. 24, 2013, 12 pgs.
European Search Report for Appln No. 13875105.2, dated Dec. 12, 2016 (9 pgs.).
Chinese Office Action for CN Patent Appln No. 201380075724.6, dated Oct. 28, 2016 (8 pgs.).
Chinese Office Action for CN Patent Appln No. 201380075724.6, dated Mar. 31, 2017 (8 pgs.).

* cited by examiner

FLUID FEED SLOT FOR FLUID EJECTION DEVICE

BACKGROUND

Fluid ejection devices, such as printheads in inkjet printing systems, may use thermal resistors or piezoelectric material membranes as actuators within fluidic chambers to eject fluid drops (e.g., ink) from nozzles. In either case, fluid flows from a reservoir into the fluidic chambers through a fluid slot that extends through a substrate on which the fluidic chambers and actuators are generally formed. A size of the fluid slot influences a size of the substrate as well as a spacing between fluid slots (i.e., slot pitch).

DETAILED DESCRIPTION

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples of the present disclosure can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

In general, printhead features such as fluid drop ejection actuators (e.g., thermal resistors, piezoelectric membranes), fluidic firing chambers, and fluidic channels (e.g., fluid slots) that route fluid from fluid supply reservoirs to the firing chambers, are fabricated on or in a substrate using a mixture of integrated circuit and MEMS techniques. In his regard, the present disclosure provides methods of fabrication that result in a fluid slot with a narrow backside width, and result in a fluid slot with a tapered profile or shape at the front side of the substrate. As such, the methods of fabrication provided herein help to reduce fluid slot size such that die size can be reduced and die separation can be increased. As a printhead die may include multiple fluid slots, a reduction in fluid slot width for each of the multiple fluid slots may result in a combined reduction in die size by a corresponding multiple (for example, a reduction in slot width of an amount x for each of four fluid slots of a die may result in a combined reduction of die size in an amount of four times x (i.e., 4×)). Considering substrate cost, such reduction in die size may provided significant cost savings. In addition, by providing a tapered profile or shape of the fluid slot at the front side of the substrate, the methods of fabrication provided herein help to improve passive air management through the slot, as compared to a straight slot. Furthermore, by providing a fluid slot with a narrower throat (i.e., narrower width), the methods of fabrication provided herein help to improve thermal performance, such that a printhead incorporating such a slot may operate at a lower operating temperature. In addition, by providing a fluid slot with a narrower width, the methods of fabrication provided herein may result in reduced spacing between fluid slots (i.e., slot pitch).

Figure 1:
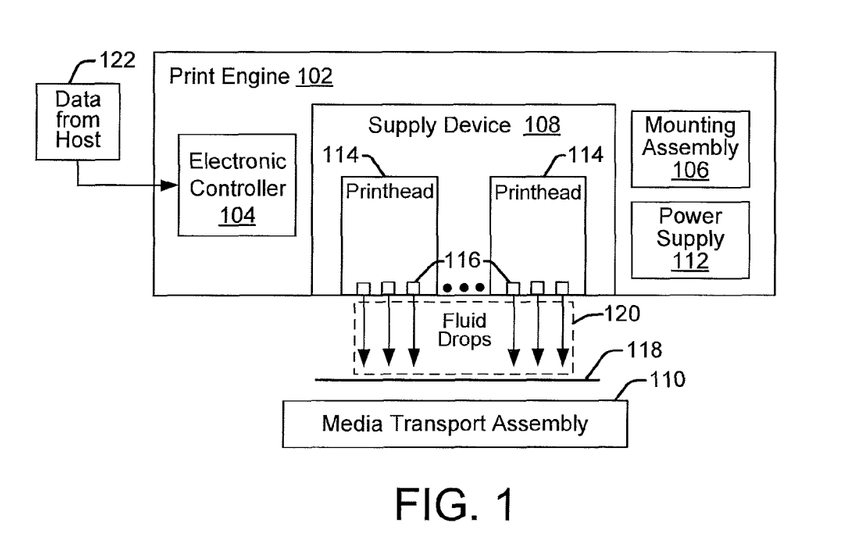
FIG. 1 is a block diagram illustrating one example of an inkjet printing system including a printhead implemented as an example of a fluid ejection device.

FIG. 1 is a block diagram illustrating one example of an inkjet printing system 100. In the illustrated example, inkjet printing system 100 includes a print engine 102 having a controller 104, a mounting assembly 106, one or more replaceable fluid supply devices 108 (e.g., print cartridges), a media transport assembly 110, and at least one power supply 112 that provides power to the various electrical components of inkjet printing system 100. Inkjet printing system 100 further includes one or more printheads 114 (i.e., fluid ejection devices) that eject droplets of ink or other fluid through a plurality of nozzles 116 (also referred to as orifices or bores) toward print media 118 so as to print onto print media 118. In one example, printhead 114 may be an integral part of an ink cartridge supply device 108, while in another example, printhead 114 may be mounted on a print bar (not shown) of mounting assembly 106 and coupled to a supply device 108 (e.g., via a tube). Print media 118 can be any type of suitable sheet or roll material, such as paper, card stock, transparencies, Mylar, polyester, plywood, foam board, fabric, canvas, and the like.

In one example, as discussed below and illustrated herein, printhead 114 comprises a thermal inkjet (TIJ) printhead that ejects fluid drops from nozzle 116 by passing electrical current through a thermal resistor ejection element to generate heat and vaporize a small portion of the fluid within a firing chamber. Printhead 114, however, is not limited to being implemented as a TIJ printhead. For example, printhead 114 can be implemented as a piezoelectric inkjet (PIJ) printhead that uses a piezoelectric material ejection element to generate pressure pulses to force fluid drops out of nozzle 116. In either example, nozzles 116 are typically arranged in one or more columns or arrays along printhead 114 such that properly sequenced ejection of ink from the nozzles causes characters, symbols, and/or other graphics or images to be printed on print media 118 as printhead 114 and print media 118 are moved relative to each other.

Mounting assembly 106 positions printhead 114 relative to media transport assembly 110, and media transport assembly 110 positions print media 118 relative to printhead 114. Thus, a print zone 120 is defined adjacent to nozzles 116 in an area between printhead 114 and print media 118. In one example, print engine 102 is a scanning type print engine. As such, mounting assembly 106 includes a carriage for moving printhead 114 relative to media transport assembly 110 to scan print media 118. In another example, print engine 102 is a non-scanning type print engine. As such, mounting assembly 106 fixes printhead 114 at a prescribed position relative to media transport assembly 110 while media transport assembly 110 positions print media 118 relative to printhead 114.

Electronic controller 104 typically includes components of a standard computing system such as a processor, memory, firmware, and other printer electronics for communicating with and controlling supply device 108, printhead(s) 114, mounting assembly 106, and media transport assembly 110. Electronic controller 104 receives data 122 from a host system, such as a computer, and temporarily stores the data 122 in a memory. Data 122 represents, for example, a document and/or file to be printed. As such, data 122 forms a print job for inkjet printing system 100 that includes one or more print job commands and/or command parameters. Using data 122, electronic controller 104 controls printhead 114 to eject ink drops from nozzles 116 in a defined pattern that forms characters, symbols, and/or other graphics or images on print medium 118.

Figure 2:
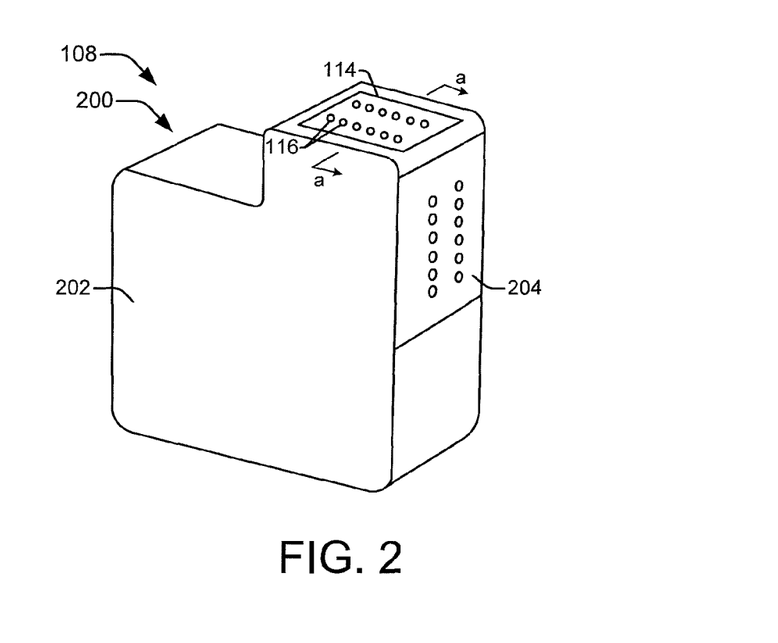
FIG. 2 is a schematic illustration of one example of a print cartridge implemented as an example of a fluid supply device for use in an inkjet printing system.

FIG. 2 is a schematic illustration of one example of a print cartridge 200 implemented as an example of fluid supply device 108 for use in inkjet printing system 100. Print cartridge 200 includes a cartridge body 202, printhead 114, and electrical contacts 204. Cartridge body 202 supports printhead 114 and electrical contacts 204 through which electrical signals are provided to activate ejection elements (e.g., resistive heating elements) that eject fluid drops from select nozzles 116. Fluid within cartridge 200 can be any suitable fluid used in a printing process, such as various printable fluids, inks, pre-treatment compositions, fixers, and the like. In some examples, the fluid can be a fluid other than a printing fluid. Cartridge 200 may contain a fluid supply within cartridge body 202, but may also receive fluid from an external supply (not shown) such as a fluid reservoir connected through a tube, for example.

Figure 3:
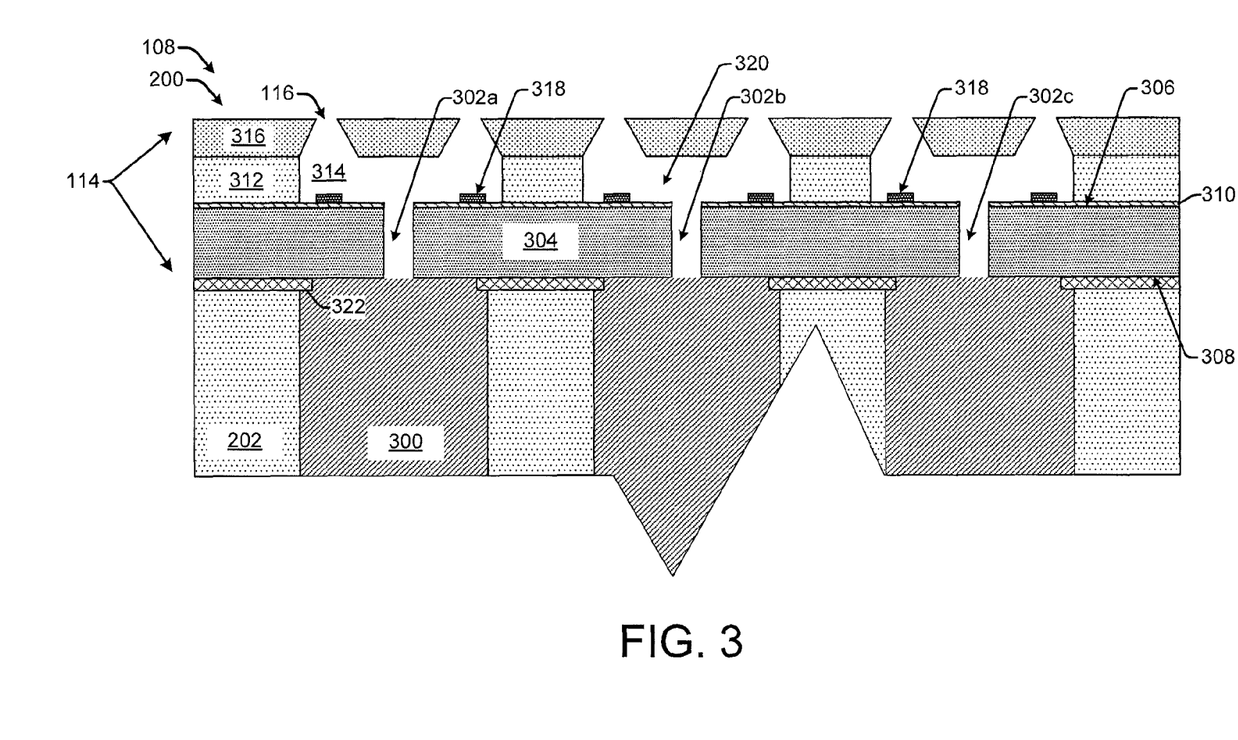
FIG. 3 is a schematic cross-sectional view illustrating one example of a portion of the print cartridge of FIG. 2.

FIG. 3 is a schematic cross-sectional view illustrating one example of a portion of print cartridge 200 of FIG. 2 implemented as an example of fluid supply device 108. Cartridge body 202 contains fluid 300 for supply to printhead 114. In the illustrated example, print cartridge 200 supplies one color of fluid or ink to printhead 114. However, in other implementations, other print cartridges can supply multiple colors and/or black ink to a single printhead. In the illustrated example, schematically-illustrated fluid-feed or fluid-handling slots 302a, 302b, and 302c pass through printhead substrate 304. While three fluid-feed slots are shown, a greater or lesser number of fluid-feed slots may be used in different printhead implementations.

In one example, substrate 304 is formed of silicon and, in some implementations, may comprise a crystalline substrate such as doped or non-doped monocrystalline silicon or doped or non-doped polycrystalline silicon. Other examples of suitable substrates include gallium arsenide, gallium phosphide, indium phosphide, glass, silica, ceramics, or a semiconducting material. Substrate 304 may be between 100 and 2000 microns thick and, in one implementation, is approximately 675 microns thick. Substrate 304 has a first or front-side surface 306 and a second or back-side surface 308 opposite front-side surface 306. In one example, an adhesive layer 322 joins substrate 304 at back-side surface 308 to cartridge body 202. In addition, a thin-film structure 310, including one or more thin-film layers such as, for example, a field or thermal oxide layer, is formed on front-side surface 306.

In one example, a barrier layer 312 is formed over thin-film structure 310, and at least partially defines firing or fluid ejection chambers 314. Barrier layer 312 may be formed, for example, of a photo-imagable epoxy. Over barrier layer 312 is an orifice plate or nozzle plate 316 having nozzles 116 through which fluid is ejected. Orifice plate 316 may be formed, for example, of a photo-imageable epoxy or a nickel substrate. In some implementations, orifice plate 316 is the same material as barrier layer 312 and, in some implementations, orifice plate 316 and barrier layer 312 may be integral.

Within each fluid ejection chamber 314 and surrounded by barrier layer 312, is an independently controllable fluid ejection element 318. In the illustrated example, fluid ejection elements 318 comprise thermal firing resistors. When an electrical current is passed through a resistor in a respective fluid ejection chamber 314, a portion of the fluid is heated to its boiling point so that it expands to eject another portion of the fluid through nozzle 116. The ejected fluid is then replaced by additional fluid from a fluid-handling passageway 320 and corresponding fluid-feed or fluid-handling slot 302a, 302b, 302c. As noted above, in different implementations, fluid ejection elements can comprise piezoelectric material ejection elements (i.e., actuators).

FIGS. 4A-4G schematically illustrate one example of forming a substrate of a fluid ejection device, and, more specifically, schematically illustrate one example of forming an opening 450 through a substrate 460 of a fluid ejection device. In one implementation, opening 450 and substrate 460 representing one example of fluid feed slot 302a, 302b, and/or 302c and substrate 304, respectively, of printhead 114 (FIG. 3). As such, FIGS. 4A-4G show partial cross-sectional views of a portion of printhead 114 of print cartridge 200 taken along line a-a in FIG. 2, as a short axis profile or view of printhead 114.

In one example, substrate 460 is a silicon substrate and opening 450 is formed in substrate 460 as described below. Substrate 460 has a first side 462 and a second side 464. Second side 464 is opposite of first side 462 and, in one example, oriented substantially parallel with first side 462. Opening 450 communicates with first side 462 and second side 464 of substrate 460 so as to provide a channel or passage through substrate 460. While only one opening 450 is illustrated and described as being formed in substrate 460, it is understood that any number of openings 450 may be formed in substrate 460.

In one example, first side 462 forms a front side of substrate 460 and second side 464 forms a back side of substrate 460 such that fluid flows through opening 450 and, therefore, through substrate 460 from the back side to the front side. Accordingly, in one implementation, opening 450 provides a fluidic channel or fluid (or ink) feed slot for the communication of fluid (or ink) with fluid ejection elements 318 (FIG. 3) through substrate 460.

Figure 4A:
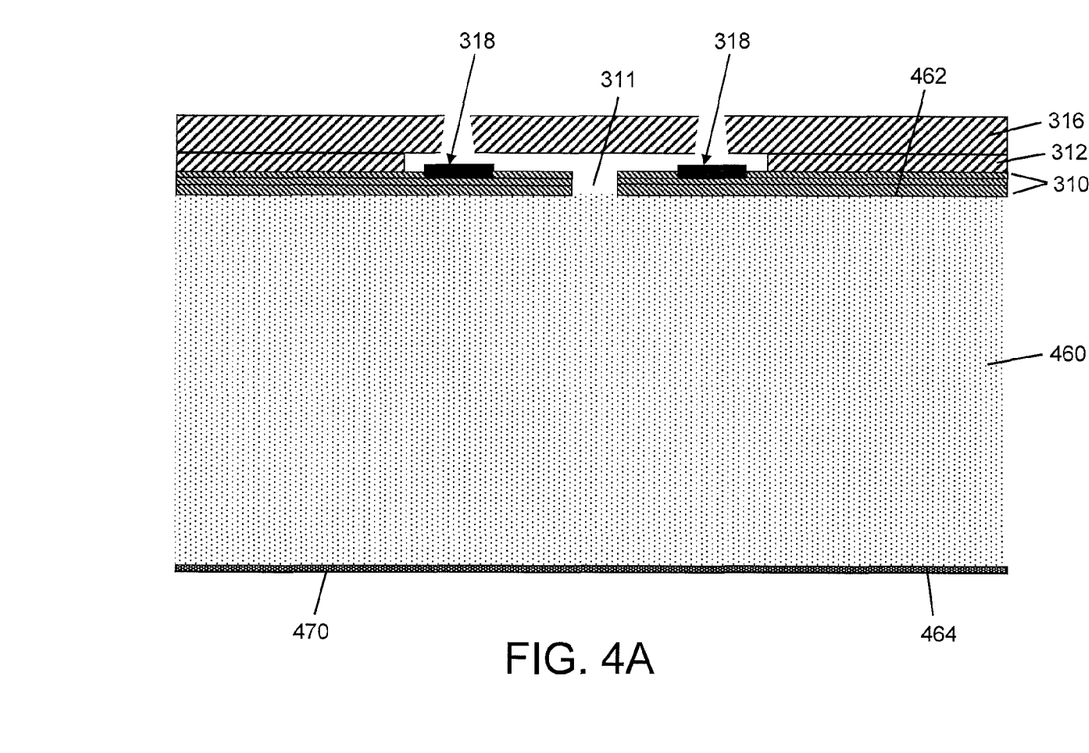
FIGS. 4A-4G schematically illustrate one example of forming a substrate for a printhead implemented as an example of a fluid ejection device.

In one example, as illustrated in FIG. 4A, before opening 450 is formed through substrate 460, a thin-film structure including fluid ejection elements, such as thin-film structure 310 including fluid ejection elements 318, is formed on first side 462 of substrate 460. Thin-film structure 310 includes one or more passivation or insulation layers formed, for example, of silicon dioxide, silicon carbide, silicon nitride, tantalum, poly-silicon glass, or other material. In addition, thin-film structure 310 also includes a conductive layer which defines fluid ejection elements 318 and corresponding conductive paths and leads. The conductive layer is formed, for example, of aluminum, gold, tantalum, tantalum-aluminum, or other metal or metal alloy. In one example, a fluid (or ink) feed hole 311 is formed or defined through thin-film structure 310, and is in fluid communication with opening 450, as formed below. Fluid feed hole 311 may be formed, for example, by dry etching or a combination of dry and wet chemical etching.

Also, as illustrated in the example of FIG. 4A, an orifice and/or barrier layer, such as barrier layer 312 and orifice plate 316, is formed on first side 462 of substrate 460 over thin-film structure 310. Barrier layer 312 and orifice plate 316 (including nozzles 116 and fluid ejection chambers 314) includes one or more layers of material compatible with the fluid (or ink) to be routed through and ejected from the fluid ejection device. Material suitable for barrier layer 312 includes, for example, a photo-imageable polymer such as SU8. Other materials, however, may be used for barrier layer 312. Orifice plate 316 may be formed, for example, of a photo-imageable epoxy or a nickel substrate. In some implementations, orifice plate 316 is the same material as barrier layer 312 and, in some implementations, orifice plate 316 and barrier layer 312 may be integral.

In one example, as illustrated in FIG. 4A, a backside layer or stack 470 including one or more mask or protective layers is formed on second side 464 of substrate 460. In one example, backside layer or stack 470 includes a hard mask made of a material that is resistant to etching environments and that will not be removed by chemicals used to remove substrate material (e.g., silicon) during the slot forming process. For example, the hard mask can be a grown thermal oxide, or a grown or deposited dielectric material such as CVD (chemical vapor deposition) oxides, silicon oxide formed with a TEOS precursor (tetraethoxysilane), silicon carbide, silicon nitride, and/or other suitable materials such as aluminum, tantalum, copper, aluminum-copper alloys, aluminum-titanium alloys, and gold. One example of backside layer or stack 470 includes a multi-layer structure of poly-silicon, silicon nitride, and silicon dioxide, which acts as a stress relief oxide (SRO) between the silicon substrate and silicon nitride.

Figure 4B:
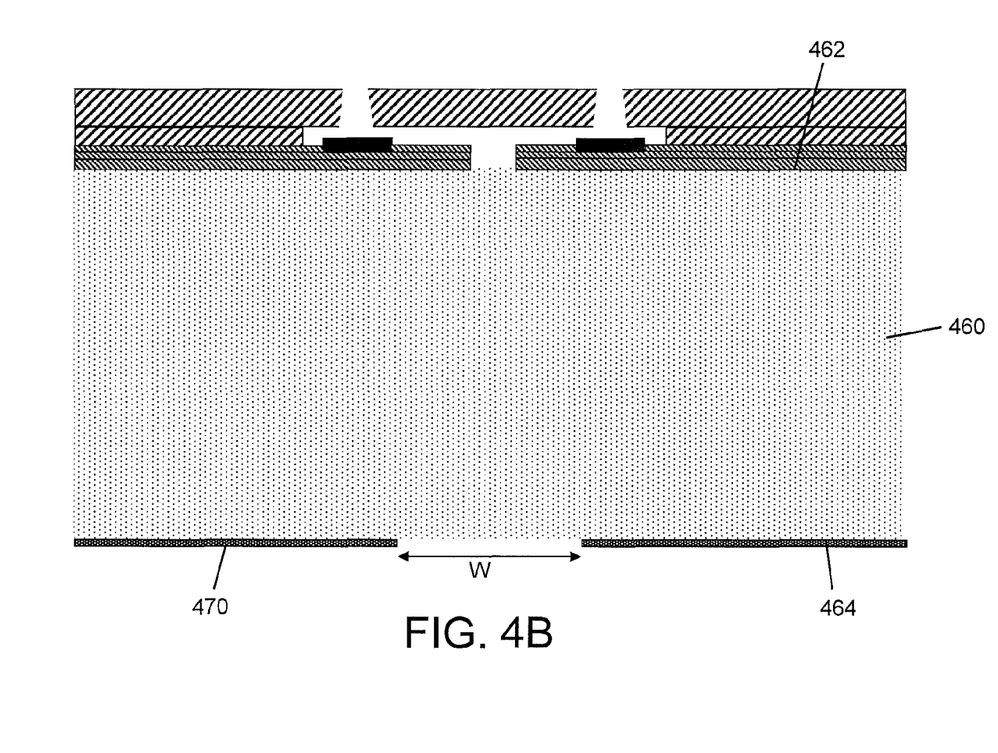

As illustrated in the example of FIG. 4B, backside layer or stack 470 is patterned such that select portions of backside layer or stack 470 are removed to expose areas of second side 464 of substrate 460. As such, backside layer or stack 470 defines where opening 450 is to be formed in substrate 460 at second side 464. A dimension of the exposed area of second side 464 of substrate 460 is represented by width W. In one example, backside layer or stack 470 is patterned and portions thereof removed by laser processing. Other manners of patterning backside layer or stack 470, however, maybe also be used, such as a photolithographic process with a dry or wet etch to remove the hard mask material.

Figure 4C:
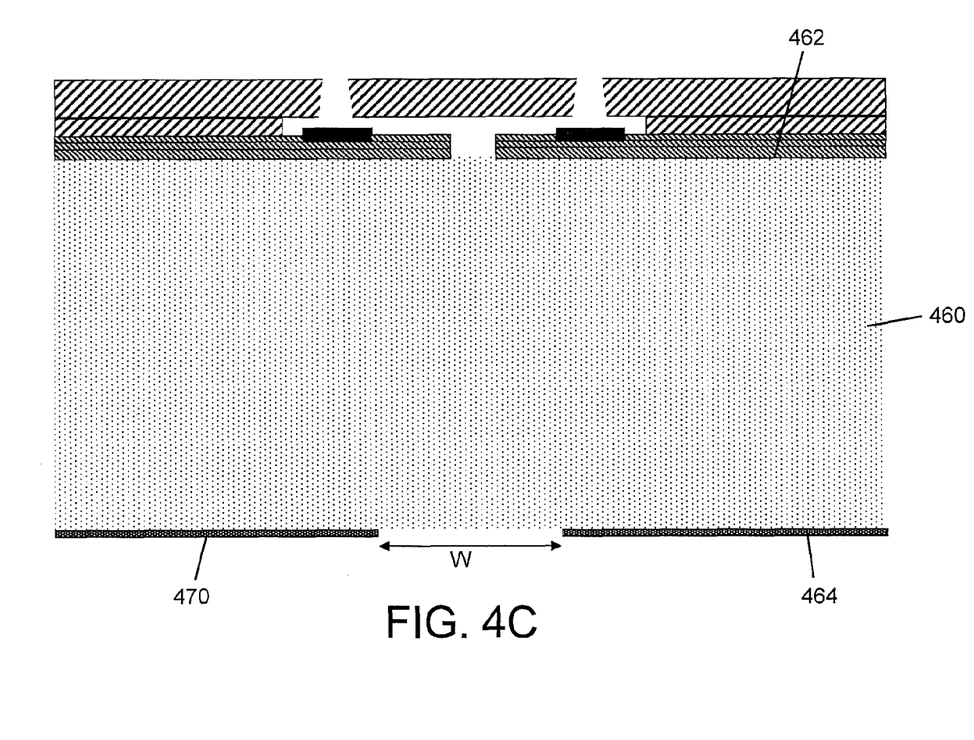

In one example, as illustrated in FIG. 4C, after backside layer 470 is patterned, a cleaning process is performed. The cleaning process removes debris, such as silicon debris, and in one example, removes the poly-silicon material from backside layer or stack 470. In one example, the cleaning process is a chemical cleaning process and uses a combination of tetra-methyl-ammonium hydroxide (TMAH) and standard cleaning solution #1 (SC1).

Figure 4D:
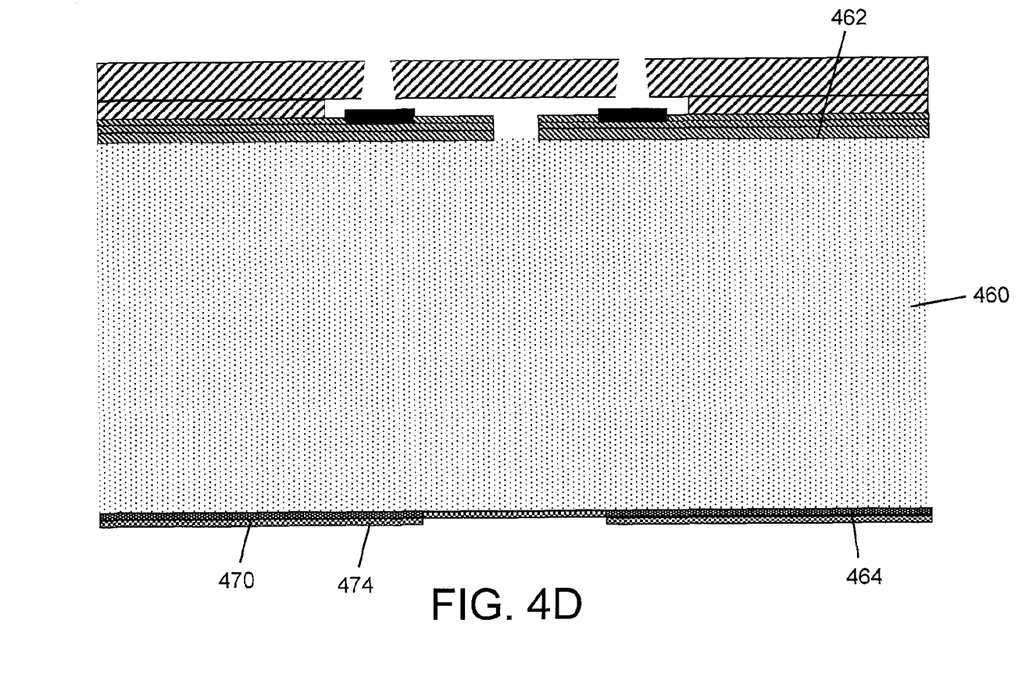

As illustrated in the example of FIG. 4D, a sacrificial mask layer 474 is formed on second side 464 of substrate 460. More specifically, sacrificial mask layer 474 is formed over backside layer or stack 470 and over exposed portions or areas of second side 464 of substrate 460. In one example, sacrificial mask layer 470 is a metal layer formed by deposition. One example of material suitable for sacrificial mask layer 470 includes a layer of titanium and aluminum.

Figure 4E:
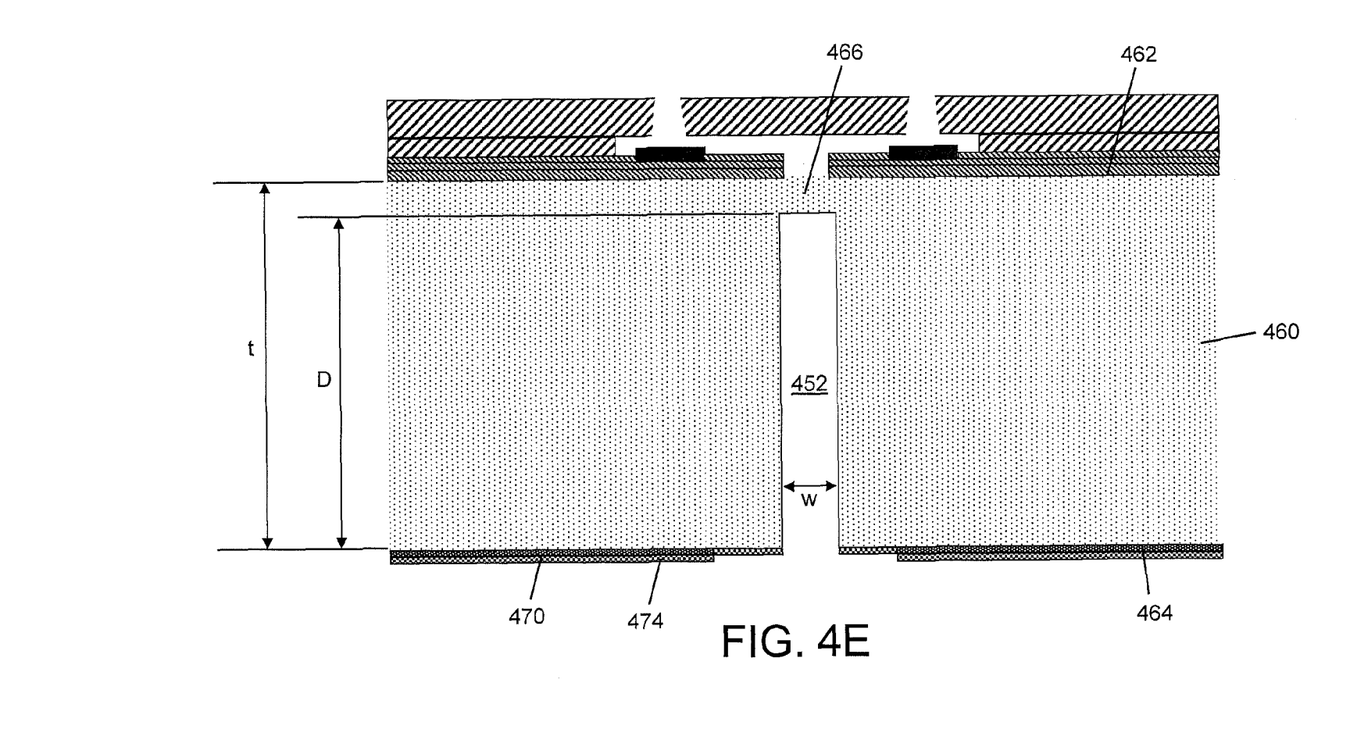

In one example, as illustrated in FIG. 4E, an initial or first portion 452 of opening 450 is formed in substrate 460. First portion 452 of opening 450, as an initial portion or phase of opening 450, is formed in substrate 460 from second side 464 toward first side 462 such that a depth D of first portion 452 is less than a full thickness t of substrate 460. As such, first portion 452 of opening 450 does not extend completely through substrate 460. In addition, in one example, a width w of first portion 452 of opening 450 at second side 464 of substrate 460 is less than width W of the previously exposed area of second side 464 of substrate 460 through patterned backside layer or stack 470 (FIG. 4B). As such, first portion 452 forms a subset of opening 450 of width w.

In one implementation, first portion 452 of opening 450 is formed in substrate 460 by laser processing through sacrificial mask layer 474. Other techniques for forming first portion 452 of opening 450 include, for example, a silicon dry etch such as a plasma enhanced reactive ion etch (RIE) with alternating sulfur hexafluoride (SF6) etching and octafluorobutene (C4F8) deposition, sand drilling and mechanically contacting the substrate material. Mechanically contacting can include, for example, sawing with a diamond abrasive blade.

As illustrated in the example of FIG. 4E, first portion 452 of opening 450 is formed through less than the entire thickness of substrate 460, thereby leaving a membrane 466 (e.g., a silicon membrane) to protect thin-film structure 310 (FIG. 4A) from the potentially damaging effects of the laser beam or other trench formation processes.

In one example, first portion 452 of opening 450 includes substantially parallel sidewalls from second side 464 to depth D. In another example, first portion 452 of opening 450 includes sidewalls at angles greater than ninety degrees (relative to second side 464) to the extent that width w of first portion 452 does not exceed width W (FIG. 4B) whereby a width of first portion 452 at depth D is less than a width of first portion 452 at second side 464.

Figure 4F:
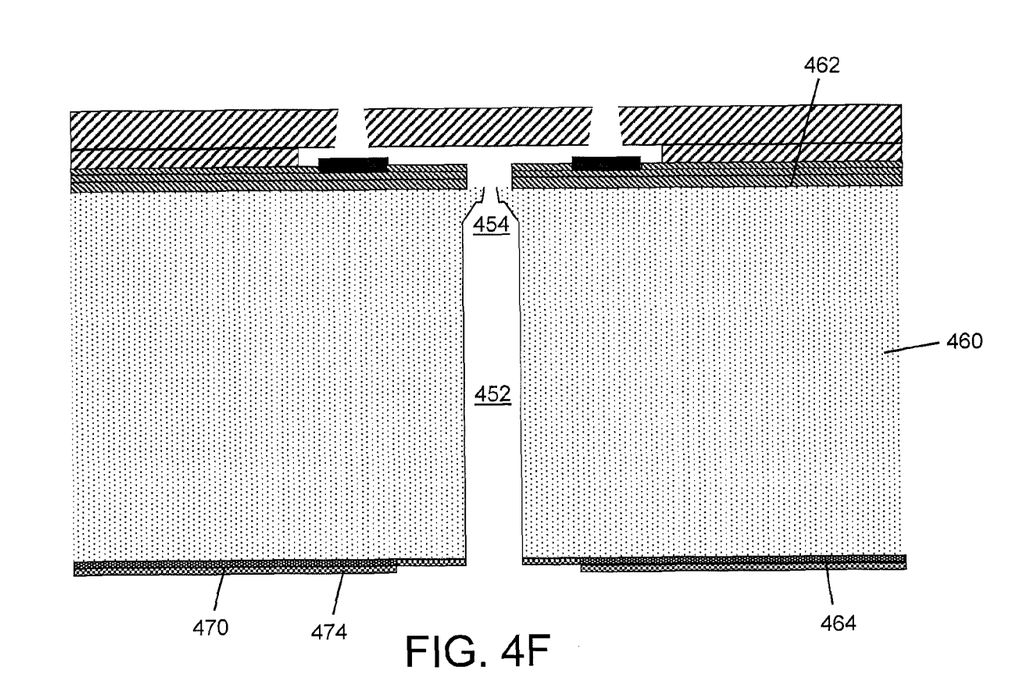

Next, as illustrated in the example of FIG. 4F, after first portion 452 of opening 450 is formed in substrate 460, another or second portion 454 of opening 450 is formed in substrate 460. Second portion 454 of opening 450, as an intermediate portion or phase of opening 450, is formed in substrate 460 from first portion 452 of opening 450 to first side 462 of substrate 460. As such, second portion 454 extends from first portion 452 to first side 462 of substrate 460 such that first portion 452 and second portion 454 together extend completely through substrate 460, so as to communicate with first side 462 and second side 464 of substrate 460.

In one implementation, second portion 454 of opening 450 is formed in substrate 460 by a dry etch process, and is performed through first portion 452 of opening 450 to first side 462 of substrate 460. In one example, the dry etch process is a reactive ion etch (RIE) using a fluorine-based plasma etch such as, for example, sulfur hexafluoride.

Figure 4G:
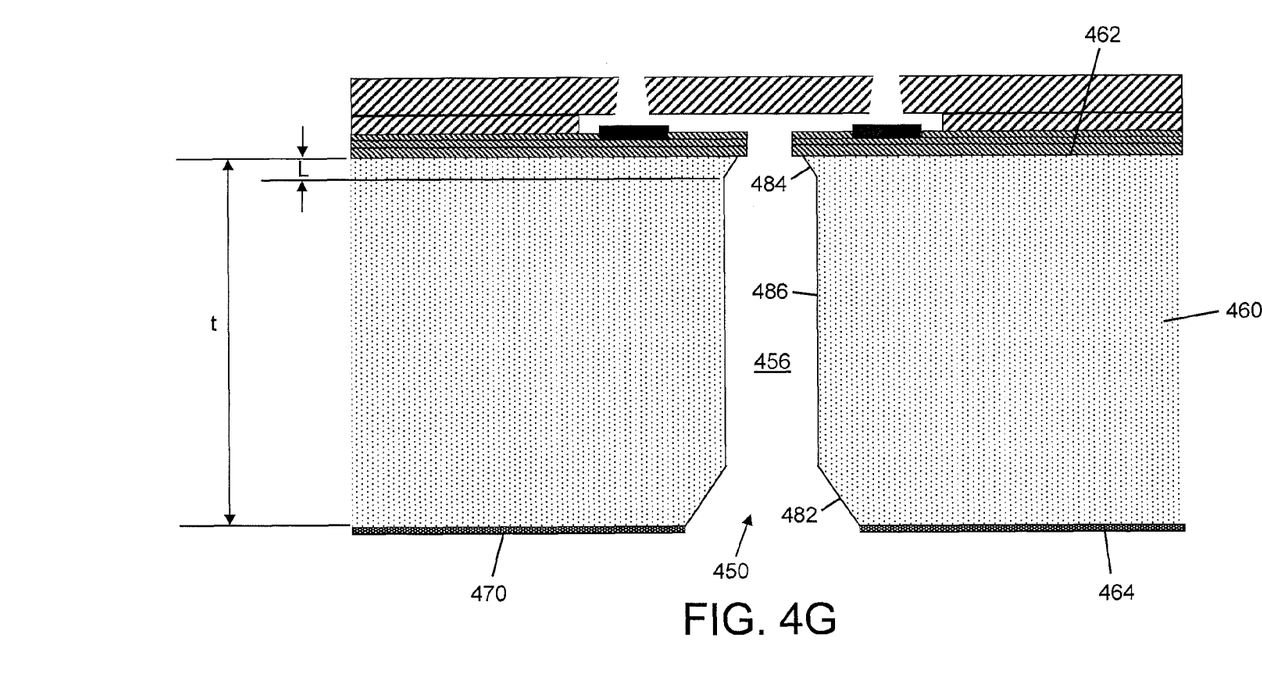

As illustrated in the example of FIG. 4G, after first portion 452 and second portion 454 of opening 450 are formed in substrate 460, another or third portion 456 of opening 450, as a final or completed portion or phase of opening 450, is formed in substrate 460. In one example, a maximum dimension of third portion 456 of opening 450 at second side 464 of substrate 460 is defined by width W of the exposed area or portion of second side 464 of substrate 460 of patterned backside layer or stack 470 (FIG. 4B).

In one example, third portion 456 of opening 450 is formed in substrate 460 using an anisotropic chemical etch process. More specifically, the chemical etch process is a wet etch process and, in one implementation, uses a wet anisotropic etchant such as tetra-methyl-ammonium hydroxide (TMAH), potassium hydroxide (KOH), or other alkaline etchant. Wet etching is achieved by immersing substrate 460 in an anisotropic etchant for a period of time sufficient to form opening 450. Etchants can include any anisotropic wet etchant that has selectivity to hard masks and exposed thin-film and other layers. In one implementation, a single instance of wet etching is used to remove the additional substrate material and form opening 450. In other implementations, the etching can include multiple instances of wet etching. In addition to forming third portion 456 of opening 450, the anisotropic wet etch process also removes sacrificial mask layer 474 (FIG. 4D).

With the anisotropic wet etch process, third portion 456 of opening 450 follows and is defined by crystalline planes of substrate 460 as a silicon substrate. More specifically, as illustrated in the example of FIG. 4G, sidewalls of third portion 456, and, therefore, opening 450, include a lower portion 482 that is communicated with and oriented at an angle to second side 464, an upper portion 484 that is communicated with and oriented at an angle to first side 462, and a middle or intermediate portion 486 that is between lower portion 482 and upper portion 484 and oriented substantially perpendicular to first side 462 and second side 464. In one example, intermediate portion 486 comprises a <110> plane of the silicon substrate, which etches the fastest in the anisotropic wet etch, and lower portion 482 and upper portion 484 comprise <111> planes of the silicon substrate, which etch more slowly than the <110> plane in the anisotropic wet etch thereby resulting in the angled portions. In one example, the etched silicon opening defined by upper portion 484 (left and right sides) is slightly wider than fluid feed hole 311 (FIG. 4A), due to the slow <111> etching.

In one example, opening 450 is generally defined by sidewalls that are substantially symmetrical from one side to the other side. In one example, sidewalls of opening 450 are substantially parallel over at least a portion of opening 450 between second side 464 of substrate 460 and first side 462 of substrate 460, and converge toward and to first side 462. As such, a dimension (e.g., width) of opening 450 is substantially constant over at least a portion of opening 450 between second side 464 of substrate 460 and first side 462, and decreases toward first side 462. In one example, a length L of the converging sidewalls of upper portion 484, as measured in a direction substantially perpendicular to first side 462, is in a range of approximately five percent to approximately fifteen percent of thickness t of substrate 460.

Figure 5A:
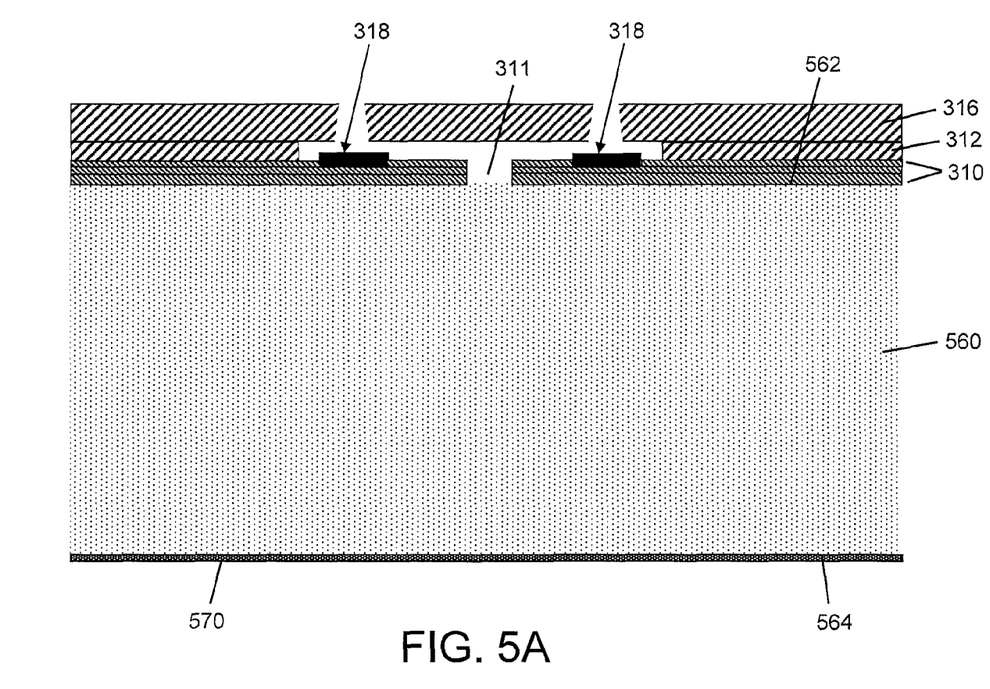
FIGS. 5A-5C schematically illustrate another example of forming a substrate for a printhead implemented as an example of a fluid ejection device.
Figure 5B:
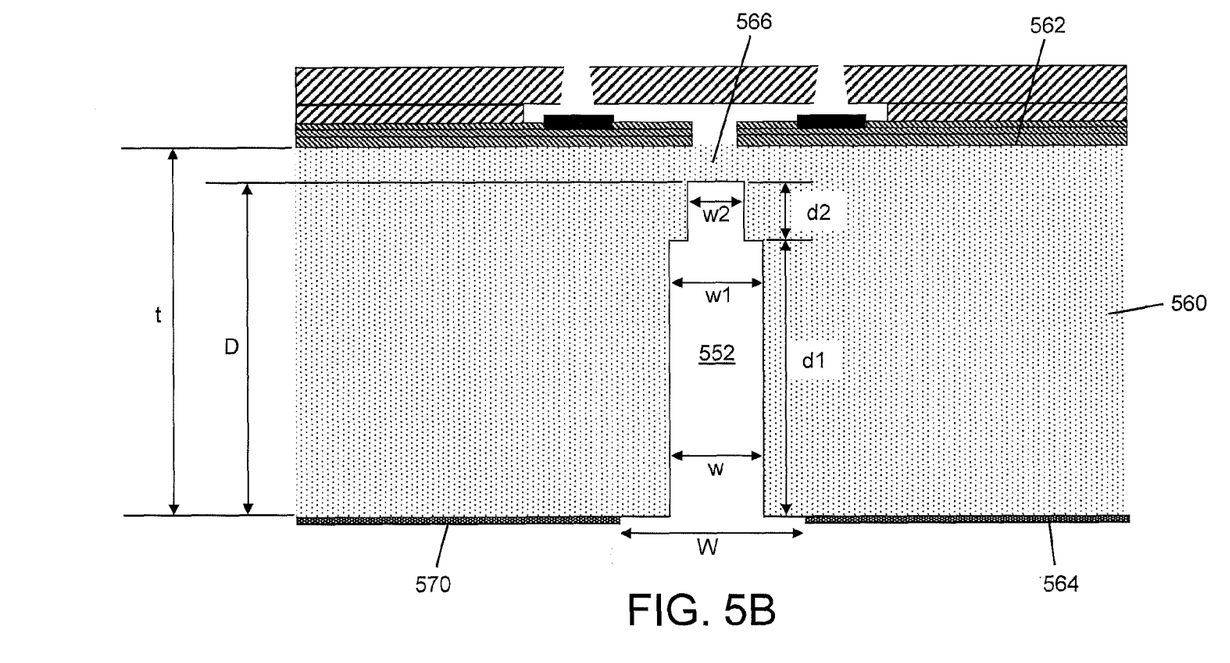
Figure 5C:
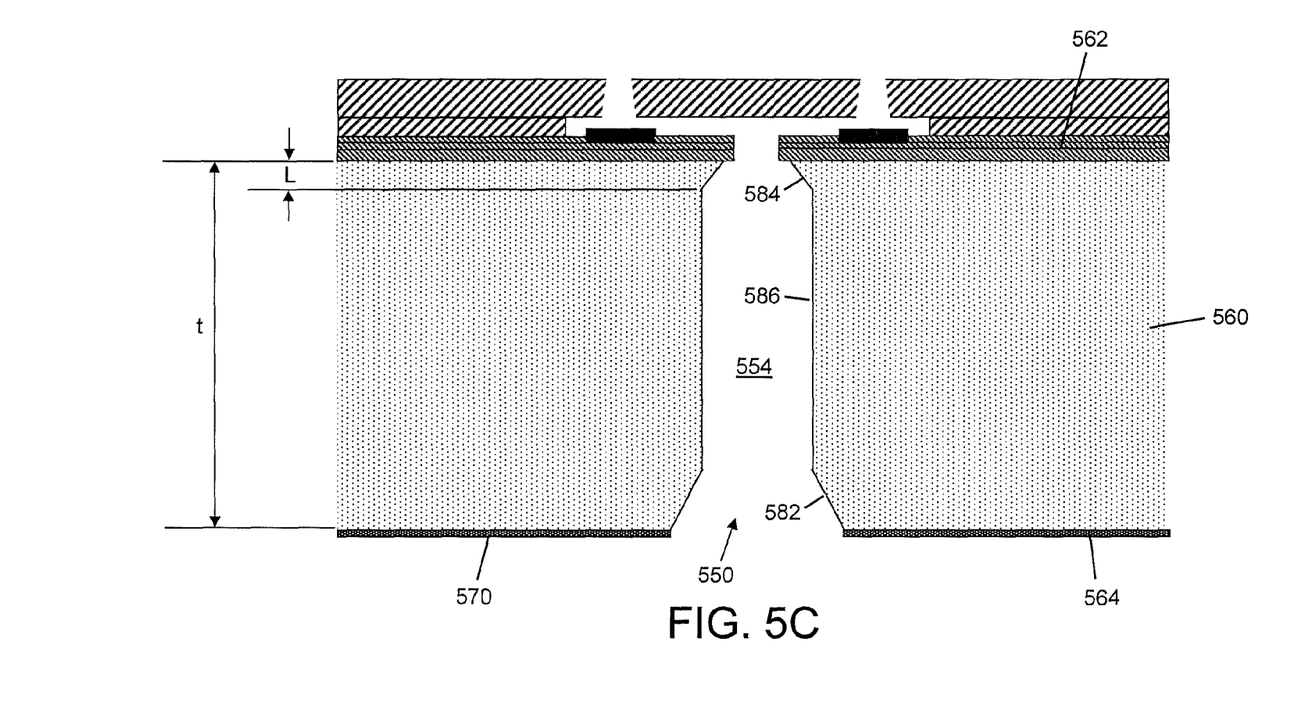

FIGS. 5A-5C schematically illustrate another example of forming a substrate of a fluid ejection device, and, more specifically, schematically illustrate one example of forming an opening 550 through a substrate 560 of a fluid ejection device. In one implementation, opening 550 and substrate 560 representing one example of fluid feed slot 302a, 302b, and/or 302c and substrate 304, respectively, of printhead 114 (FIG. 3). As such, FIGS. 5A-5C show partial cross-sectional views of a portion of printhead 114 of print cartridge 200 taken along line a-a in FIG. 2, as a short axis profile or view of printhead 114.

In one example, substrate 560 is a silicon substrate and opening 550 is formed in substrate 560 as described below. Substrate 560 has a first side 562 and a second side 564. Second side 564 is opposite of first side 562 and, in one example, oriented substantially parallel with first side 562. Opening 550 communicates with first side 562 and second side 564 of substrate 560 so as to provide a channel or passage through substrate 560. While only one opening 550 is illustrated and described as being formed in substrate 560, it is understood that any number of openings 550 may be formed in substrate 560.

In one example, first side 562 forms a front side of substrate 560 and second side 564 forms a back side of substrate 560 such that fluid flows through opening 550 and, therefore, through substrate 560 from the back side to the front side. Accordingly, in one implementation, opening 550 provides a fluidic channel or fluid (or ink) feed slot for the communication of fluid (or ink) with fluid ejection elements 318 (FIG. 3) through substrate 560.

In one example, as illustrated in FIG. 5A, before opening 550 is formed through substrate 560, a thin-film structure including fluid ejection elements, such as thin-film structure 310 including fluid ejection elements 318, is formed on first side 562 of substrate 560. As described above, thin-film structure 310 includes one or more passivation or insulation layers formed, for example, of silicon dioxide, silicon carbide, silicon nitride, tantalum, poly-silicon glass, or other material. In addition, thin-film structure 310 also includes a conductive layer which defines fluid ejection elements 318 and corresponding conductive paths and leads. The conductive layer is formed, for example, of aluminum, gold, tantalum, tantalum-aluminum, or other metal or metal alloy. In one example, a fluid (or ink) feed hole 311 is formed or defined through thin-film structure 310, and is in fluid communication with opening 550, as formed below. Fluid feed hole 311 may be formed, for example, by dry etching or a combination of dry and wet chemical etching.

Also, as illustrated in the example of FIG. 5A, an orifice and/or barrier layer, such as barrier layer 312 and orifice plate 316, is formed on first side 562 of substrate 560 over thin-film structure 310. As described above, barrier layer 312 and orifice plate 316 (including nozzles 116 and fluid ejection chambers 314) includes one or more layers of material compatible with the fluid (or ink) to be routed through and ejected from the fluid ejection device. Material suitable for barrier layer 312 includes, for example, a photo-imageable polymer such as SU8. Other materials, however, may be used for barrier layer 312. Orifice plate 316 may be formed, for example, of a photo-imageable epoxy or a nickel substrate. In some implementations, orifice plate 316 is the same material as barrier layer 312 and, in some implementations, orifice plate 316 and barrier layer 312 may be integral.

In one example, as illustrated in FIG. 5A, a backside layer or stack 570 including one or more mask or protective layers is formed on second side 564 of substrate 560. In one example, backside layer or stack 570 includes a hard mask made of a material that is resistant to etching environments and that will not be removed by chemicals used to remove substrate material (e.g., silicon) during the slot forming process. For example, the hard mask can be a grown thermal oxide, or a grown or deposited dielectric material such as CVD (chemical vapor deposition) oxides, silicon oxide formed with a TEOS precursor (tetraethoxysilane), silicon carbide, silicon nitride, and/or other suitable materials such as aluminum, tantalum, copper, aluminum-copper alloys, aluminum-titanium alloys, and gold. One example of backside layer or stack 570 includes a multi-layer structure of poly-silicon, silicon nitride, and silicon dioxide, which acts as a stress relief oxide (SRO) between the silicon substrate and silicon nitride.

In one example, as illustrated in FIG. 5B, an initial or first portion 552 of opening 550 is formed in substrate 560. First portion 552 of opening 550, as an initial portion or phase of opening 550, is formed in substrate 560 from second side 564 toward first side 562 such that a depth D of first portion 552 is less than a full thickness t of substrate 560. As such, first portion 552 of opening 550 does not extend completely through substrate 560.

In one example, as first portion 552 of opening 550 is formed in substrate 560, backside layer or stack 570 is patterned such that select portions of backside layer or stack 570 are removed to expose areas of second side 564 of substrate 560. As such, backside layer or stack 570 defines where opening 550 is to be formed in substrate 560 at second side 564. A dimension of the exposed area of second side 564 of substrate 560 is represented by width W such that a width w of first portion 552 of opening 550 at second side 564 of substrate 560 is less than width W. As such, first portion 552 forms a subset of opening 550 of width w.

In one implementation, first portion 552 of opening 550, and the patterned and removed portions of backside layer or stack 570, are formed in substrate 560 by laser processing through backside layer or stack 570. In one example, the laser processing includes a first laser process of a first width w1 to a first depth d1 followed by a second laser process of a second width w2 for an additional, second depth d2, where first width w1 is greater than second width w2, and second depth d2 is less than first depth d1 and is to depth D of first portion 552. In one implementation, the first laser process includes a six-wide laser process, and the second laser process includes a four-wide laser process.

Other techniques for forming first portion 552 of opening 550 include, for example, a silicon dry etch such as a plasma enhanced reactive ion etch (RIE) with alternating sulfur hexafluoride (SF6) etching and octafluorobutene (C4F8) deposition, sand drilling and mechanically contacting the substrate material. Mechanically contacting can include, for example, sawing with a diamond abrasive blade.

As illustrated in the example of FIG. 5B, first portion 552 of opening 550 is formed through less than the entire thickness of substrate 560, thereby leaving a membrane 566 (e.g., a silicon membrane) to protect thin-film structure 310 (FIG. 5A) from the potentially damaging effects of the laser beam or other trench formation processes.

In one example, first portion 552 of opening 550 includes substantially parallel sidewalls from second side 564 to depth D, including substantially parallel sidewalls of depth d1 and depth d2. In another example, first portion 552 of opening 550 includes sidewalls at angles greater than ninety degrees (relative to second side 564) to the extent that width w of first portion 552 does not exceed width W whereby a width of first portion 552 at depth D, including at depth d1 and depth d2, is less than a width of first portion 552 at second side 564.

Next, as illustrated in the example of FIG. 5C, after first portion 552 of opening 550 is formed in substrate 560, another or second portion 554 of opening 550 is formed in substrate 560. Second portion 554 of opening 550, as a final or completed portion or phase of opening 550, is formed in substrate 560 from first portion 552 of opening 550 to first side 562 of substrate 560. As such, second portion 554 extends from first portion 552 to first side 562 of substrate 560 such that first portion 552 and second portion 554 together extend completely through substrate 560, so as to communicate with first side 562 and second side 564 of substrate 560. In addition, in one example, a maximum dimension of second portion 554 of opening 550 at second side 564 of substrate 60 is defined by width W of the exposed area or portion of second side 564 of substrate 560 of patterned backside layer or stack 570 (FIG. 5B).

In one example, second portion 554 of opening 550 is formed in substrate 560 using an anisotropic chemical etch process. More specifically, the chemical etch process is a wet etch process and, in one implementation, uses a wet anisotropic etchant such as tetra-methyl-ammonium hydroxide (TMAH), potassium hydroxide (KOH), or other alkaline etchant. Wet etching is achieved by immersing substrate 560 in an anisotropic etchant for a period of time sufficient to form opening 550. Etchants can include any anisotropic wet etchant that has selectivity to hard masks and exposed thin-film and other layers. In one implementation, a single instance of wet etching is used to remove the additional substrate material and form opening 550. In other implementations, the etching can include multiple instances of wet etching.

With the anisotropic wet etch process, second portion 554 of opening 550 follows and is defined by crystalline planes of substrate 560 as a silicon substrate. More specifically, as illustrated in the example of FIG. 5C, sidewalls of second portion 554, and, therefore, opening 550, include a lower portion 582 that is communicated with and oriented at an angle to second side 564, an upper portion 584 that is communicated with and oriented at an angle to first side 562, and a middle or intermediate portion 586 that is between lower portion 582 and upper portion 584 and oriented substantially perpendicular to first side 562 and second side 564. In one example, intermediate portion 586 comprises a <110> plane of the silicon substrate, which etches the fastest in the anisotropic wet etch, and lower portion 582 and upper portion 584 comprise <111> planes of the silicon substrate, which etch more slowly than the <110> plane in the anisotropic wet etch thereby resulting in the angled portions. In one example, the etched silicon opening defined by upper portion 584 (left and right sides) is slightly wider than fluid feed hole 311 (FIG. 5A), due to the slow <111> etching.

In one example, opening 550 is generally defined by sidewalls that are substantially symmetrical from one side to the other side. In one example, sidewalls of opening 550 are substantially parallel over at least a portion of opening 550 between second side 564 of substrate 560 and first side 562 of substrate 560, and converge toward and to first side 562. As such, a dimension (e.g., width) of opening 550 is substantially constant over at least a portion of opening 550 between second side 564 of substrate 560 and first side 562, and decreases toward first side 562. In one example, a length L of the converging sidewalls of upper portion 584, as measured in a direction substantially perpendicular to first side 562, is in a range of approximately five percent to approximately fifteen percent of thickness t of substrate 560.

While the above description refers to the inclusion of substrate 460 or 560 having opening 450 or 550 formed therein in an inkjet printhead assembly, it is understood that substrate 460 or 560 having opening 450 or 550 formed therein may be incorporated into other fluid ejection systems including non-printing applications or systems as well as other applications having fluidic channels through a substrate, such as medical devices or other micro electro-mechanical systems (MEMS devices). Accordingly, the methods, structures, and systems described herein are not limited to printheads, and are applicable to any slotted substrates. In addition, while the above description refers to routing fluid or ink through opening 450 or 550 of substrate 460 or 560, it is understood that any flowable material, including a liquid such as water, ink, blood, or photoresist, or flowable particles of a solid such as talcum powder or a powdered drug, or air may be fed or routed through opening 450 or 550 of substrate 460 or 560.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A fluid ejection device, comprising:
a substrate having a first side and a second side opposite the first side;
a thin-film structure formed on the first side of the substrate; and
a fluid feed slot formed by an opening extending through the substrate between the first side and the second side,
wherein the fluid feed slot has parallel sidewalls intermediate the first side and the second side, converging sidewalls from the parallel sidewalls to the first side, and diverging linear sidewalls sloped from the parallel sidewalls to the second side,
wherein a length of the converging sidewalls, as measured in a direction substantially perpendicular to the first side, is in a range of approximately five percent to approximately fifteen percent of a thickness of the substrate.

2. The fluid ejection device of claim 1, wherein the thin-film structure has a fluid feed hole formed therethrough, wherein the fluid feed slot is communicated with the fluid feed hole, and wherein, at the first side, the fluid feed slot, as defined by the converging sidewalls, is wider than the fluid feed hole.

3. The fluid ejection device of claim 1, wherein the fluid feed slot is formed by laser machining followed by anisotropic wet etching.

4. The fluid ejection device of claim 3, wherein the laser machining comprises laser machining the substrate from the second side toward the first side.

5. The fluid ejection device of claim 1, wherein the fluid feed slot is formed by laser machining followed by dry etching followed by anisotropic wet etching.

6. The fluid ejection device of claim 5, wherein the laser machining comprises laser machining the substrate from the second side toward the first side to form a portion of the opening in the substrate.

7. The fluid ejection device of claim 6, wherein the dry etching comprises dry etching the substrate from the portion of the opening to the first side.

8. The fluid ejection device of claim 1, wherein the converging sidewalls are oriented at an angle to the parallel sidewalls and the first side, and the diverging linear sidewalls are oriented at an angle to the parallel sidewalls and the second side.

9. The fluid ejection device of claim 1, wherein the substrate comprises a silicon substrate, and the converging sidewalls comprise <111> planes of the silicon substrate from the parallel sidewalls to the first side and the diverging linear sidewalls comprise <111> planes of the silicon substrate from the parallel sidewalls to the second side.

* * * * *